(12) United States Patent
Kudo

(10) Patent No.: US 9,004,362 B1
(45) Date of Patent: Apr. 14, 2015

(54) METHOD AND APPARATUS FOR UTILIZING THREE DIMENSION PRINTING FOR SECURE VALIDATION

(71) Applicant: Susan Leeds Kudo, Pacific Palisades, CA (US)

(72) Inventor: Susan Leeds Kudo, Pacific Palisades, CA (US)

( * ) Notice: Subject to any disclaimer, the term of this patent is extended or adjusted under 35 U.S.C. 154(b) by 0 days.

(21) Appl. No.: 14/040,711

(22) Filed: Sep. 29, 2013

(51) Int. Cl.
  *G06K 19/00* (2006.01)
  *G06K 1/12* (2006.01)
  *G06K 7/14* (2006.01)

(52) U.S. Cl.
  CPC .............. *G06K 1/123* (2013.01); *G06K 7/1426* (2013.01); *G06K 1/121* (2013.01)

(58) Field of Classification Search
  USPC ........................................................ 235/462
  See application file for complete search history.

(56) References Cited

U.S. PATENT DOCUMENTS

2007/0152032 A1\* 7/2007 Tuschel et al. ................ 235/375
2009/0080048 A1\* 3/2009 Tsao ............................. 359/211

\* cited by examiner

*Primary Examiner* — Matthew Mikels
(74) *Attorney, Agent, or Firm* — Abraham N. Seidman

(57) ABSTRACT

The invention uses three-dimensional printing techniques to lay down a three-dimensional black and white grid (or "4-dimensional" grid, if color is used). To read and decode a three-dimensional bar-code, a light-field camera is used to capture the whole three-dimensional structure and the focus levels are then determined for a predetermined number of vertical levels. Adding color adds another degree of freedom (dimension) in the number and difficulty of encoding and decoding the three-dimensional bar-codes. These bar-codes cannot be simply made or copied, providing a level of security thereby.

6 Claims, 6 Drawing Sheets

METHOD AND APPARATUS FOR UTILIZING THREE DIMENSION PRINTING FOR SECURE VALIDATION

FIELD OF THE INVENTION

T This invention elates to three-dimensional printing
This invention relates to validating data which is intended to be secure.

BACKGROUND OF THE INVENTION

Bar codes have been used to identify objects for some time. These are linear sequence of black bars against a white (or light) background. To increase the amount of information encoded, two-dimensional codes in both an "x" and a "y" direction were developed. (e.g., U.S. Pat. No. 5,726,435, M. Hara, et al., "Optically readable two-dimensional code and method and apparatus for the same."). In addition, for "linear bar codes, a "$2^{nd}$ dimension" could be added by varying the heights of the bars. For printable bar codes, color could also be used as an additional dimension.

All of these types of codes are readily counterfeited or copies, by 'xeroxing' and by generating the codes according to a decrypted or otherwise known methodology.

A more secure approach is to have actual three-dimensional codes ("x", "y" and "z" directions) printed by the techniques of three-dimensional printing. This type of "3-dimensional" coding does not appear to have been exploited. In this "x-y-z" three dimensionality, color may also be added as a "4-th dimension".

It should be noted that 'light-field' cameras have been developed which can capture a more complete depth of field than conventional cameras and which can show different focal planes of a scene upon demand. (e.g., U.S. Pat. No. 8,471,897, Rodriguez Ramos, et al, "Camera for the real-time acquisition of visual information fro three-dimensional scene"; U.S. Pat. No. 8,290,358, T. G. Giorgiev, "Method and apparatus for light imaging field;", U.S. Pat. No. 8,531,783, Zalevsky et al., "Imaging method and system for imaging with extended depth of focus.")

I Further one notes the development of "three-dimensional printing techniques which can be used to deposit, by printing, three-dimensional objects. For example, see U.S. Pat. No. 5,204,055, Sachs, et al., Three-dimensional printing techniques.

SUMMARY OF THE INVENTION

The invention uses three-dimensional printing techniques to lay down a three-dimensional black and white grid (or "4-dimensional" grid, if color is used). A light-field camera is used to capture the whole three-dimensional structure and the focus levels are then determined for a predetermined number of vertical levels, say, 1000. Then for an x- and y-direction resolution, each, of 1000, the overall encodable points rises from $10^6$ to $10^9$. If 10 encodable point are allowed per symbol definition, then the number of symbols is increased from 10,000 available to 1,000,000.

Even more important, the coded identification cannot be simply constructed by copying or laying out a two-dimensional printed pattern according to some algorithm. A whole apparatus of three-dimensional reading and three-dimensional printing would be required, as well as a knowledge of an appropriate algorithm. When, say, 10 colors are added for each dimension, then one has available a billion symbols.

While this part may be approachable by a national security organization, when combined with encryption methods, it may take a national security organization centuries to duplicate this labeling.

This type of labeling may well be used on spare parts for modular aircraft electronic replacement modules. At the other end of the spectrum, it could be used by a "meter maid" to scan license plate stickers to identify illegally parked cars.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE BEST MODE OF THE INVENTION

The following description is of the best mode presently contemplated for carrying out the invention. This description is not to be taken in a limiting sense, but is merely made for the purpose of describing the general principles of the invention.

Figure 1A:
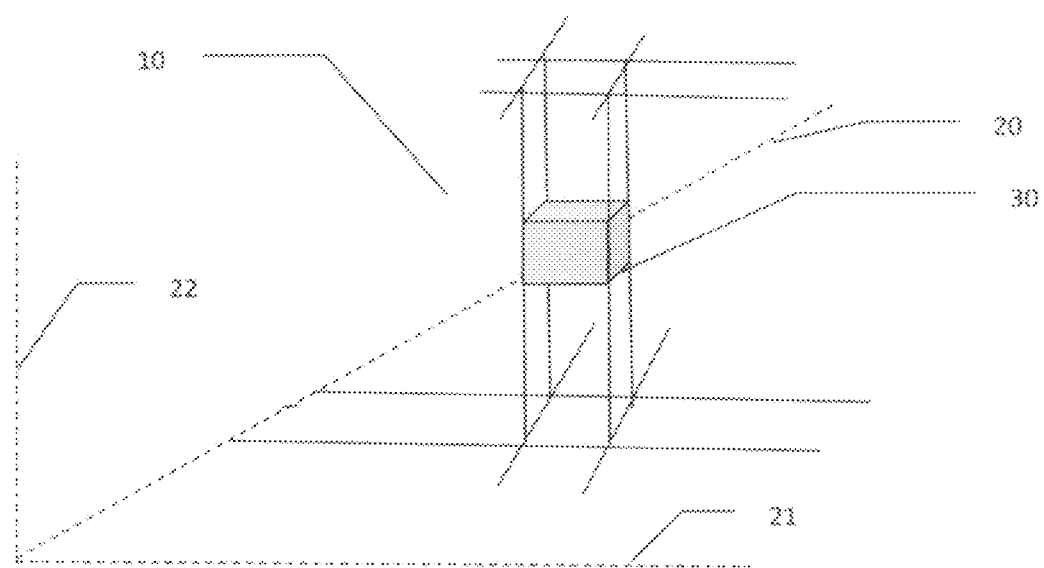
FIG. 1a depicts a three dimensional black-and-white "bar code", location in three dimensional co-ordinates, as printed.

FIG. 1a shows a nominal three-dimensional black and white printed bar code, in a sketched fashion 10. Three-dimensional printing has been developed as a method for making objects by building them up from repeated layers of an appropriate substance. As shown t is in black and white. That is, the heights of each two-dimensionally located grid square has a detectable height 30. This allows for the positional encoding of information. There are thus $N^3$ available points in space, where N 20. 21, 22 is a uniform linear dimension with N points reliable discriminated.

Figure 1B:
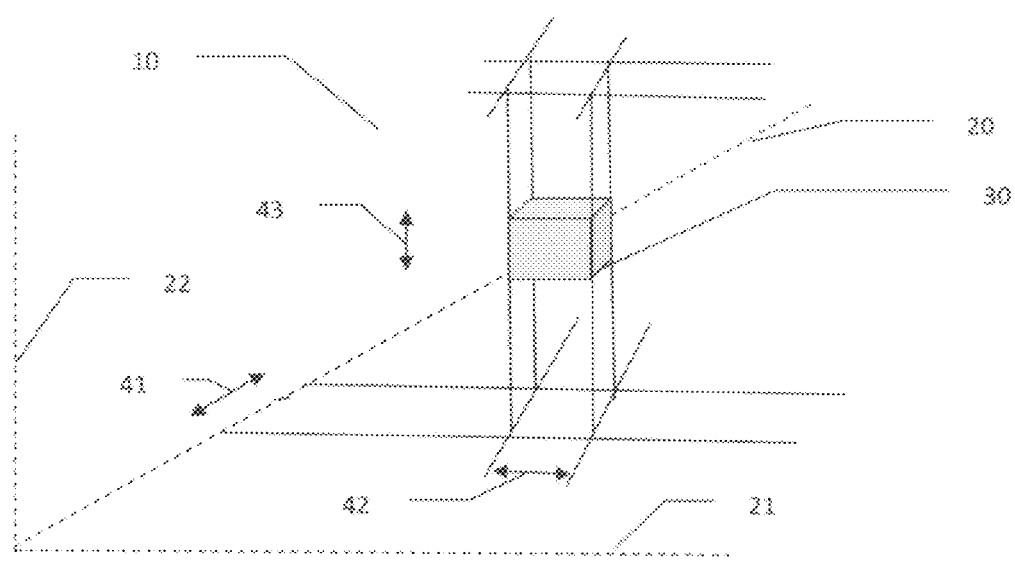
FIG. 1b depicts the three-dimensional bar-code with non-uniform dimensional measures in the x-, y-, and z-directions.

(FIG. 1b) For rectangular dimensions, with different linear lengths, the number of encodable points is thus (length,l) 41×(width,w) 42×(height,h) 43, or, lwh, with l, w, and h points being the number of points in each dimension that can be reliably discriminated and determined.

Note that the reference is to actual three-dimensionally located points In some versions of actual one and two dimensional bar codes, the height of a bar may be varied, in that system, to achieve another "dimension", quite legitimately. However, distinguishing, in this invention, the third dimension is the 43 (FIG. 1b) actual height. This has the advantage that specialized three-dimensional equipment is required to make and read such three-dimensional bar graphs; they cannot be produced by ordinary printing method or read by ordinary bar-cod readers.

Figure 1C:
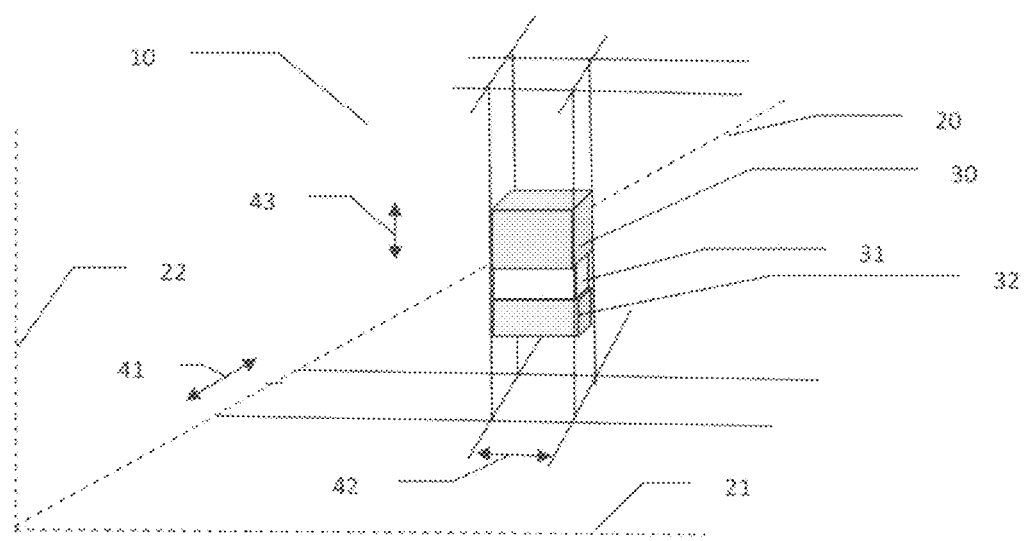
FIG. 1c depicts a "four-dimensional" color "bar code", as printed.

FIG. 1c depicts a three dimensional bar code with the addition of color, contributing another dimension. The granularity of this "fourth-dimension" varies according to the ability of the printer and reader of this invention to reliably deposit and detect the variety of colors 30, 31, 32 intended for use. The number of encodable points then becomes $N^3 \times C$, where C is the number of colors which are reliable discriminated. Alternatively, for a rectangular layout, l×w×h×C, is the number of encodable points, as above, in FIG. 1b, with the addition now of a number of different colors.

Columns of different colors 30, 31, 32 (FIG. 1c) can be used as fiduciary markings in the third dimension, as elements of a plane which can be focused on, as the various arrangements of bar-codes at different heights are used to encode the information which it is desired to contain within the three-dimensional bar-code.

((((It should be noted that as one progressively utilizes bar-code objects which are of size N−j, j=1 to N−1 in each direction, for example, for equally sized x-,y- and z-dimensions, one can count on at least, positionally located,)))

Figure 2:
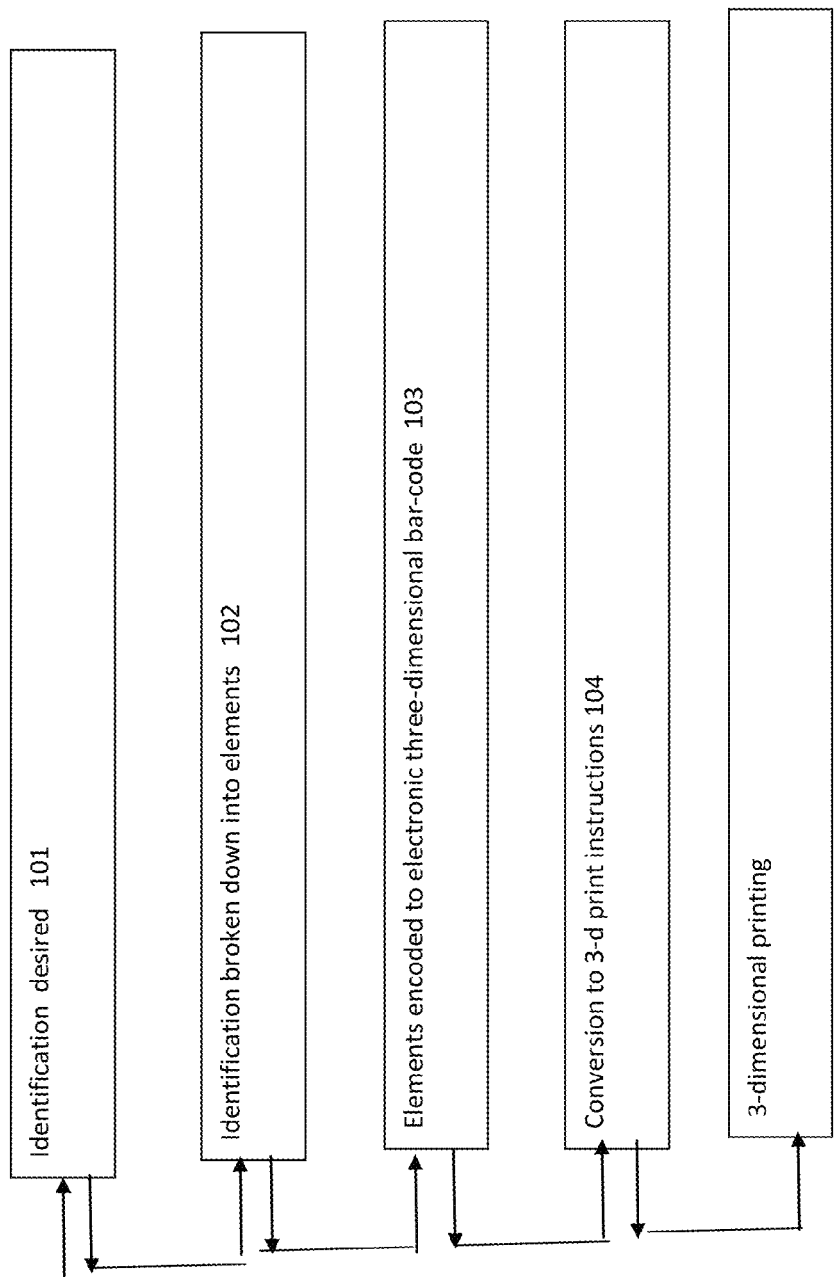
FIG. 2 diagrams the steps in formulating and printing a three/four dimensional "bar code"

FIG. 2 indicates the steps in encoding the three-dimensional printing. First the appropriate identification 101 is selected/The identification selected is then broken down into elements 102, e.g., a name would be broken down into letters and a license plate number might be broken down into numbers and letters. The elements are encoded into an electronic format, expressing a three-dimensional bar code 103 The next step is to convert this electronic 3-dimensional representation into print instructions 104 for the three-dimensional printer. The last step is actually printing in three-dimensions using a three-dimensional printer. The 3-D printer prints with materials appropriate to the vertical resolution desired.

Figure 3:
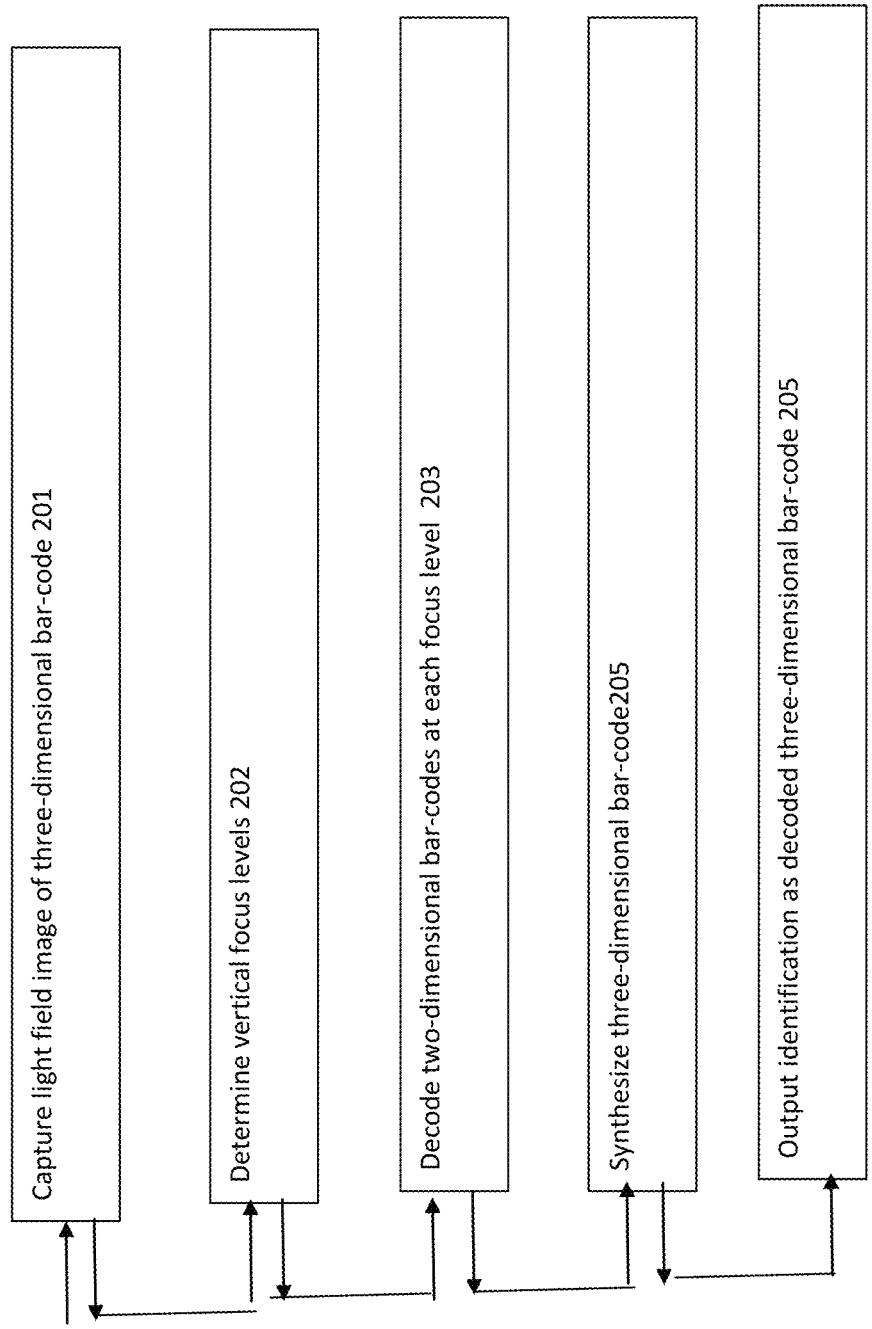
FIG. 3 diagrams the steps in retrieving the information from a three/four dimensional "bar code"

FIG. 3 indicates the steps to capture the image of the three-dimensional bar-code and to decode it. First a light field camera captures the total image 201 of the three-dimensional bar code, since the light field camera is not limited to a single focal plane. The next step is to determine the various resolvable focus levels. In the case where color is a dimension, fiduciary columns which have different colors arranged in an order vertically, may be used to aid the identification of the vertical focus levels. A with bar codes in general, certain positions, horizontal as well as vertical may be used to provide fiduciary information to assist in decoding the three-dimensional bar-code. The next step in to decode the two-dimensional bar-codes which comprise each vertical focus level 203

The three-dimensional bar-code is then synthesized 204 from the two dimensional bar codes at each focus level.

From this, identification is output from decoding 205 (FIG. 3) the three-dimensional bar-code, inverting the step 103 of FIG. 2.

Figure 4:
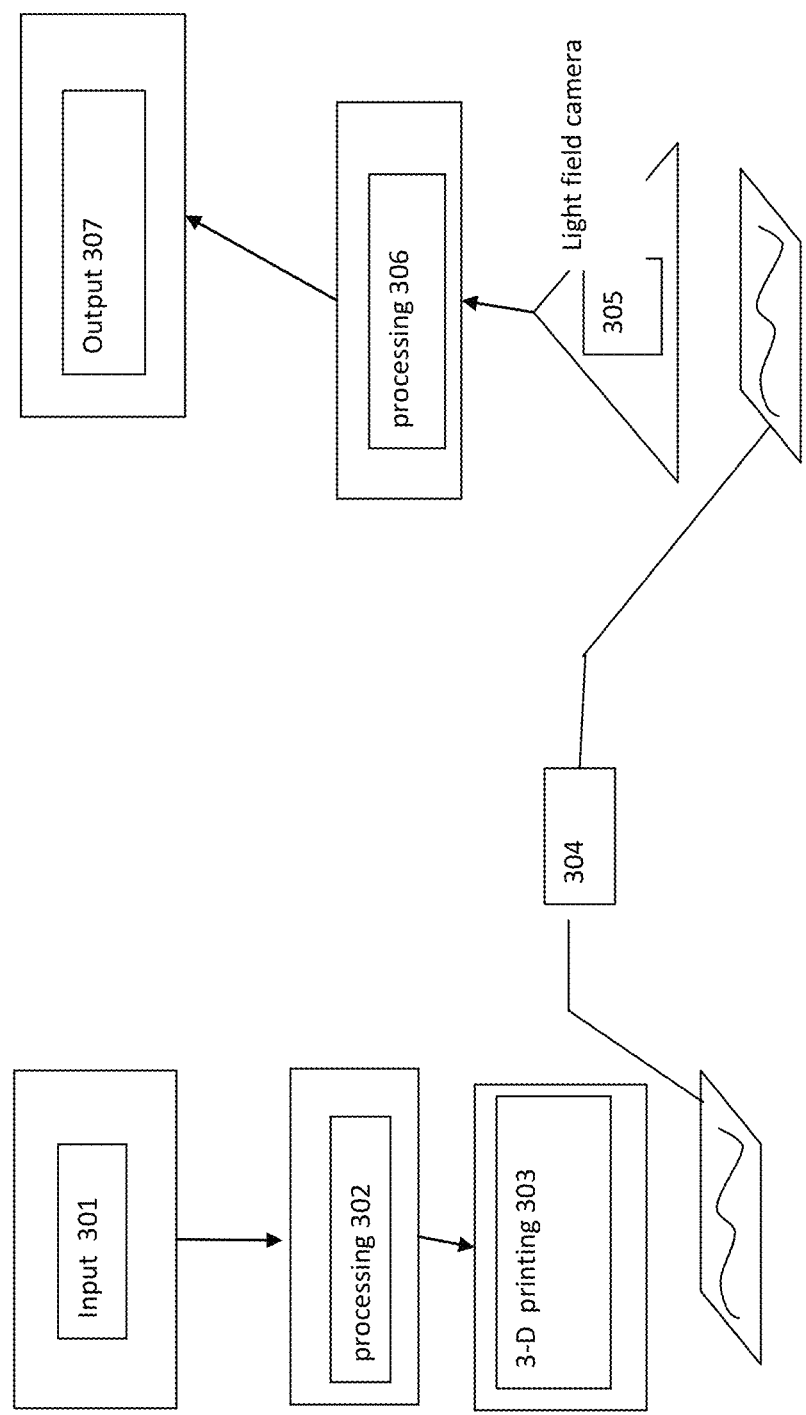
FIG. 4 shows a schematic of a light-field camera with associated processing.

FIG. 4 shows the light field camera and the associated processor for capturing and decoding the three-dimensional bar-code.

FIG. 5 shows the apparatus for making the three-dimensional bar-code. The desired identification is input 301 and processed 302 to produce via a 3-dimensional printer, a 3-dimensional bar-code 304.

This 3-dimensional bar-code 304 can then be read by a light field camera 305 which provides information to a processor 306 which then outputs 307 the identification encoded in the 3-dimensional bar-code 304.

It should be noted that when referring to a three-dimensional bar-code, it also refers to an alternative four-dimensional bar-code with the additional dimension of color incorporated into the three-dimensional bar-code structure.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention.

It is claimed that:

1. An apparatus for printing and decoding a three-dimensional bar-code, comprising:
   an input mechanism to receive a desired identification;
   a processor to encode the desired identification into an electronic code suitable to operate a 3-dimensional printer;
   a three-dimensional printer which can print a three-dimensional bar-code;
   a black and white three-dimensional bar-code produced by the three-dimensional printer;
   a light field camera to capture an image of the three-dimensional bar-code;
   a processor to analyze and decode the information derived from the three-dimensional bar-code by the light field camera; and
   an output device to record and display the identification decoded from the three-dimensional bar-code.

2. The apparatus of claim 1, further comprising an additional dimension provided by adding distinct colors in addition to the black and white bar code.

3. A method for producing a black and white three-dimensional bar code, comprising:
   inputting a desired identification to a processor;
   breaking down the desired identification into elements;
   encoding the elements into an electronic version suitable to operate a three-dimensional printer;
   converting the three-dimensional bar code electronic version into 3-dimensional printer instructions; and
   printing a three-dimensional bar-code.

4. The method of claim 3, further comprising:
   incorporating color printing into the three-dimensional code so as to add a fourth encoding dimension.

5. A method for decoding an identification within a three-dimensional bar-code, comprising:
   capturing the image of three-dimensional bar-code using a light field camera;
   processing the captured light field image to determine vertical focus levels;
   decoding two-dimensional bar codes at each focus level; and
   synthesizing the three-dimensional bar-code as an electronic version; and
   output an identification as decoded from the three-dimensional bar-code.

6. The method of claim 5m further comprising:
   including color as part of the three-dimensional bar-code; and
   decoding the information which is contained in the color information dimension.

* * * * *